United States Patent [19]

Carlos et al.

[11] B 3,914,208

[45] Oct. 21, 1975

[54] THERMOSET COATINGS FROM NON-REACTIVE POLYMERS

[75] Inventors: Donald D. Carlos, Middletown, Ky.; Darrell D. Hicks, Jeffersontown, Ky.

[73] Assignee: Celanese Coatings & Specialties Company, Jeffersontown, Ky.

[22] Filed: Nov. 14, 1973

[21] Appl. No.: 415,847

[44] Published under the Trial Voluntary Protest Program on January 28, 1975 as document no. B 415,847.

[52] U.S. Cl.... 260/86.1 E; 260/33.2 R; 260/33.4 R; 260/33.6 UA
[51] Int. Cl.²..............C08F 220/18; C08F 220/26; C08F 220/28; C08F 220/42

[58] Field of Search .. 260/33.2 R, 86.1 E, 33.6 UA, 260/33.4 R

[56] References Cited
UNITED STATES PATENTS 3,663,467  5/1972  Albright.......................... 260/86.1 E
3,763,117  10/1973  McKenna et al................ 260/86.1 E
3,780,003  12/1973  Seymour et al................. 260/86.1 E

OTHER PUBLICATIONS

"Macromolecular Syntheses," Overberer, Ed., 1, p. 5, (Wiley & Sons, 1963).

*Primary Examiner*—Allan Lieberman
*Assistant Examiner*—T. DeBenedictis, Sr.
*Attorney, Agent, or Firm*—Herbert P. Price; K. A. Genoni; T. J. Morgan

[57] ABSTRACT

A thermosetting polymeric composition useful in preparing protective coatings is disclosed comprising:
1. a co-polymer formed by co-polymerizing monomers at least a part of which are low molecular weight alcohol ester monomers and hydroxy monomers;
2. a tin thermosetting curing catalyst selected from tin alcoholates, carboxylates, halides and alkyl oxides; and
3. a solvent therefor.

7 Claims, No Drawings

THERMOSET COATINGS FROM NON-REACTIVE POLYMERS

BACKGROUND OF INVENTION

Many varying types of coating compositions which are thermosetting are known. These compositions, however, generally require three basic components: the polymeric coating, a crosslinking agent, and a curing catalyst. While in some cases the catalyst may be removed from the system or eliminated entirely, there is still a need in most thermosetting systems for two separate reactive components.

While such two- or three-component systems are not necessarily disadvantageous, a reduction in the total number of components obviously increases the profitability of the final coating and makes compounding infinitely easier.

Furthermore, where two potentially reactive components are maintained together in the same solution, co-reaction is always possible and the stability of such two-component systems is most always a limiting factor in their ultimate use.

It is an object of this invention to prepare self-curing coating systems which are relatively stable in the presence of a catalyst, but which autocondense under the desired conditions.

It is yet another object of this invention to prepare coating systems which are rapidly curable at low temperatures and which produce solvent-resistant, tough, smooth, wrinkle-free finishes.

SUMMARY OF INVENTION

These and other objectives are obtained by preparing the coatings described in the instant invention. Basically, these coatings comprise a catalyst and a copolymer of ethylenically unsaturated monomers formed from about 10 to about 60% by weight, based upon the total monomer content, of an alpha beta ethylenically unsaturated aliphatic pendant hydroxy-containing monomer and at least 1 mol of an alpha beta ethylenically unsaturated, low molecular weight alcohol ester monomer per mol of hydroxy monomer. The ester monomer is preferably selected from acrylate esters prepared from alcohols containing 5 or less carbon atoms. Admixed with the copolymer is a tin curing catalyst as described hereinafter. These components are mixed together in a solvent for the entire system.

DESCRIPTION OF INVENTION

The polymers useful in the instant invention are conveniently prepared by organic solvent polymerization techniques involving the addition of varying amounts of the desired monomers to, in most cases, a solvent mixture in the reaction kettle. The addition times, solvents utilized, and the like, are well known in the art, and are generally governed by the various processing parameters, including the solubility of the final polymer, the polymeric composition, and the like.

The co-polymers of the instant invention are prepared by co-polymerizing two essential monomeric classes:

A. An alpha-beta ethylenically unsaturated, aliphatic, hydroxy-containing monomer, and
B. An alpha-beta, ethylenically unsaturated, low molecular weight alcohol acrylate ester monomer.

The aliphatic, hydroxy-containing monomer comprises from about 10 to about 60% of the co-polymer backbone, preferably about 15 to about 40%. Examples of this monomer include the hydroxy alkyl esters of polymerizable acids, including the hydroxy alkyl esters of acrylic acid, methacrylic acid, crotonic acid, itaconic acid, and half acid esters of maleic and fumaric acids, formed with saturated alcohols having from 1 to 10 carbon atoms. The preferred hydroxy alkyl esters are those which contain 2 to 4 carbon atoms in the alkyl group. Examples of these esters are beta hydroxy ethyl acrylate, beta hydroxy ethyl methacrylate, beta hydroxy propylacrylate, beta hydroxy propyl methacrylate, gamma hydroxy propyl acrylate, beta hydroxy butyl crotonate, bis(beta hydroxy propyl) maleate, bis-(beta hydroxy ethyl) fumarate, and the like. Hydroxy alkyl esters can generally be made by reacting a mono-epoxide compound with a polymerizable alpha-beta ethylenically unsaturated acid. Additional beta hydroxy alkyl esters useful in preparing the hydroxy-containing monomers of this invention are made by reacting the polymerizable acids as hereinbefore described with such mono-epoxides as ethylene oxide, 1,2-propylene oxide, 1,2-butylene oxide, 2,3-butylene oxide, styrene oxide, phenyl glycidyl ether, butyl glycidyl ether, and the like. Most preferred of the hydroxy-containing monomers are beta hydroxy ethyl acrylate and beta hydroxy propyl acrylate.

The second type of monomer useful herein is an alpha-beta ethylenically unsaturated alcohol ester having the formula:

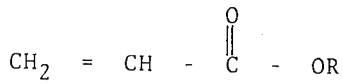

wherein R is $C_1$–$C_5$. At least about 1 mol of this ester monomer should be utilized herein for each mole of the above-identified hydroxy monomer, preferably about 1 to 2 mols.

In addition to these monomers, the co-polymers of the instant invention can contain other ethylenically unsaturated monomers which are co-polymerizable therewith. Examples of these monomers include styrene, vinyl toluene, vinyl acetate, vinyl propionate, vinyl butyrate, vinyl laurate, vinyl oleate, vinyl stearate, and the other vinyl esters of fatty acids having from 1 to 18 carbon atoms. Likewise, the various esters of polymerizable acids such as crotonic, itaconic, fumaric and maleic acids can be utilized.

Acrylonitrile, methacrylonitrile, acrylamide, methacrylamide, methylstyrene, allyl acetate, glycidyl methacrylate, t-butylaminoethyl methacrylate, vinyl pyrrolidone, N,N-dimethylaminoethyl methacrylate, ethylene, propylene, vinyl chloride, vinyl fluoride, vinylidene fluoride, hexafluoropropylene, chlorotrifluoroethylene, and tetrafluoroethylene can also be used as the monomers herein.

In addition, of course other acrylate esters or methacrylate esters may be utilized in the instant invention, and they need not comply with the above requirements on the acrylate monomers. For example, 2-ethyl hexylacrylate or methacrylate may be utilized herein, but of course would not be counted in determining the amount of the low molecular weight alcohol acrylate ester.

Generally any of the varied methods of vinyl polymerization may be utilized in the instant invention. Preferably, however, the various polymerization initiators are utilized. Examples include organic peroxides, such as tertiary butyl hydroperoxide, ditertiary butyl hydroperoxide, cumene hydroperoxide, dicumyl peroxide, benzoyl peroxide, and the like. Equally suitable are organic peroxygen compounds, such as tertiary butyl peroxide acetate, tertiary butyl perbenzoate, ditertiary butyl diperphthalate, and the like. Other initiators include azodi-isobutyronitrile (AIBN), ultra-violet light, gamma radiation, etc.

The polymers of the instant invention may be prepared by a bulk polymerization process or by adding the above-described monomers to the reaction medium of a period ranging from 30 minutes to 10 to 12 hours. The polymerization initiator may be added to the reaction flask or may be mixed with the monomer, or separately added, depending upon the desired final product. Reaction temperatures may vary from 70° to 80° C. up to about 180° to 220° C. or higher, again depending upon the various desired end products and the monomers utilized.

The polymers of the instant invention may be prepared in virtually any solvent in which the final polymer is soluble and which is not interferingly reactive with either the final product, the initiators or the monomers utilized. Examples of the solvents which may be utilized include, but are not limited to, the various alcohols, ester alcohols, ether alcohols, esters, and the like. In addition, minor amounts of petroleum-based solvents, such as mineral spirits, naphthas, and the like, may be utilized. The final significant component of the instant invention is a catalyst for the crosslinking reaction which occurs when the polymers of the instant invention are baked. It is theorized that the reaction which enables cross-linking is in the nature of an alcoholysis reaction. In other words, the alcohol group on the 5 carbon or less alcohol acrylate ester is replaced by reaction with a pendant hydroxyl group in the polymeric backbone during baking with the 5 carbon or less alcohol then being split off as an effluent. Crosslinking results.

The tin catalysts which may be used to effect this reaction are selected from

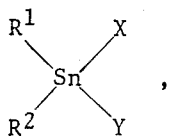

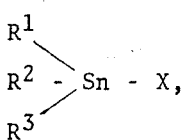

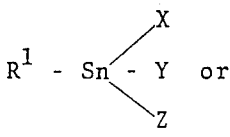

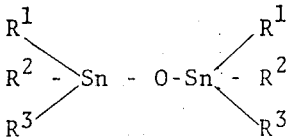

wherein $R^1$, $R^2$, and $R^3$ are 1 to 18 carbon atom alkyl or acyl groups and wherein X, Y and Z are

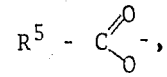

Cl—, Br—, I—, or —$OR^6$, wherein $R^5$ and $R^6$ are 1 to 18 carbon alkyl groups. The preferred catalysts are the dialkyl tin dicarboxylates, the dialkyl tin dichlorides, the trialkyl tin carboxylates, the trialkyl tin chlorides and the trialkyl tin oxides. The most preferred catalysts are dibutyl tin diacetate, dibutyl tin dilaurate and dibutyl tin dichloride.

The amount of the catalyst which is added is preferably 0.5% to 10% by weight, based on the total copolymer solids content, most preferably 2% to 8%.

In order to prepare coatings from the products of the instant invention, the polymeric material is blended with the catalyst described above in combination with various pigments, fillers, and other materials normally used in coatings systems. The material is then applied by spraying, brushing, dipping, etc. to the desired substrate, and baked at temperatures ranging from about 250° to 500° F. for from 30 seconds to 30 minutes, in order to produce a finished coating.

In the following examples all parts and percentages are by weight unless otherwise indicated.

EXAMPLE 1.

Into a reaction flask equipped with a reflux condenser, nitrogen inlet, agitator and thermometer, were added 1500 parts of 2-ethyl hexanol. The contents of the flask were heated to 184° C. and an addition of 1050 parts of ethyl acrylate, 450 parts of hydroxyethyl acrylate and 75 parts of ditertiary butyl peroxide was begun and carried out over approximately 3 hours. The temperature ranged from 180° to 150° C. Temperature was maintained at about 150° C. for 4 additional hours. Utilizing an aspirator and oil pump vacuum and temperature ranging up to 200° C., the reaction solvent was stripped off, resulting in a product having solids content of 98.4%, a Gardner Holt 25° C. viscosity of T at 80% solids in methyl Cellosolve, and a Gardner color of less than 1.

10.2 parts of the above product were blended with 4.8 parts of methyl Cellosolve and 0.4 parts of dibutyl tin diacetate.

A 1½ mil drawdown on a Bonderite 1000 cold rolled steel panel was made. The drawdown was baked at 350° F. for 30 minutes, and produced a smooth, even glossy film, having good adhesion, a pencil hardness of 2B to B, a pencil hardness after a one minute xylene soak of less than 4B, but not dissolved, and a greater than 160 in/lb reverse impact.

EXAMPLE 2

The ethyl acrylate-hydroxyethyl acrylate polymer prepared in Example 1 was cured by blending 10.2 parts thereof with 0.4 parts of dibutyl tin diacetate and 4.8 parts of methyl Cellosolve. A 1.5 mil drawdown on a Bonderite 1000 cold roll steel panel was prepared. The drawdown was baked for 30 minutes at 350° F., producing a film having good gloss and appearance, fair mar resistance, a pencil hardness of HB-F, and a 1 minute xylene soak pencil hardness of less than 4B, but not dissolved.

EXAMPLE 3

Into a reactor as described in Example 1 were added 300 parts of Solvesso 150 (Standard Oil of California). The temperature was increased to 180° C. and a mixture of 15 parts of ditertiary butyl peroxide, 90 parts of hydroxyethyl acrylate, and 210 parts styrene was added over a 4 hour period, with constant monomer and solvent reflux. After all the monomer was added, the contents of the reactor were held at about 165° C. for 2 hours. At this point an aspirator vacuum was applied and essentially all the reaction solvent was removed, resulting in a polymer having a percent solids of 99.2. 20.0 parts of the above copolymer were blended with 0.8 parts of dibutyl tin diacetate and 13.3 parts methyl Cellosolve. A 1½ mil drawdown on a Bonderite 1000 cold rolled steel panel was prepared and baked at 350° F. for 30 minutes. There resulted a film having a good gloss, fair mar resistance, and a pencil hardness of HB–F.

EXAMPLE 4

10.0 parts of the polymer prepared in Example 3 were blended with 6.7 parts of methyl Cellosolve and no catalyst. A 1½ mil drawdown as described above baked at 350° F. exhibited a pencil hardness of 2B–B and quickly dissolved upon the application of xylene indicating no appreciable degree of curing or crosslinking.

EXAMPLE 5

Into a reaction flask equipped as in Example 1, at a temperature of about 88° C. were carried out dual additions from two funnels, one containing 91.0 parts of 2-mercaptoethanol and 1.75 parts of ditertiary butyl peroxide, and the other containing 231 parts of styrene, 231 parts of ethyl acrylate and 147 parts of hydroxyethyl acrylate. The additions were carried out over approximately 3 hours at a temperature ranging from about 110° to about 120° C. The resulting polymer was taken to 93.2% conversion and then stripped of unreacted monomers. 40 parts of this polymer were blended with 1.6 parts of dibutyl tin diacetate and 103 parts of methyl Cellosolve. The resulting blend exhibited a Gardner Holt 25° C. viscosity of M–N. A 1½ mil drawdown of the above system was made on a Bonderite 1000 cold rolled steel panel and baked at 350° F. for 30 minutes. There resulted a film which had excellent gloss and flow, good mar resistance, and a pencil hardness of F–H, and which passed a 160 in.-lb. reverse impact test.

EXAMPLE 6

Into a reactor equipped as in the previous example were added 304.5 parts of ethyl acrylate and 130.5 parts of hydroxyethyl acrylate. The contents of the flask were heated to about 95° C. and an addition of 65.0 parts of 2-mercapto ethanol was carried out over a 10 minute period. The resulting contents of the flask were then heated to about 120° C. and separate additions were carried out over 4½ hours, comprising in one feed, 2,131.5 parts of ethyl acrylate, 938.5 parts of ethyl acrylate, 938.5 parts of hydroxyethyl acrylate, and 10 parts of ditertiary butyl peroxide, and in the other feed 455.0 parts of 2-mercapto ethanol. A polymer resulted having a solids content of 94.2%, and a Gardner Holt viscosity of 25° C. of $Z-Z_1$. After stripping, 20.0 parts of the resulting material were blended with 0.8 parts of dibutyl tin diacetate. A 1½ mil drawdown on Bonderite 1000 steel panel was baked at 350° for 30 minutes. The resulting film exhibited an excellent flow, gloss and appearance, good mar resistance, good adhesion, and a pencil hardness of HB–F.

EXAMPLE 7

Utilizing essentially the same procedure as in the preceding example, a polymer comprising 375.9 parts of ethyl acrylate, 70.0 parts of styrene, and 190.4 parts of hydroxy ethyl acrylate was prepared, utilizing 63.7 parts of mercapto ethanol and 1.75 parts of ditertiary butyl peroxide as initiators. It exhibited a solids content of 93.9%, prior to stripping, a Gardner 25° C. viscosity of $Z_6+$, and a reduced viscosity at 80% concentration of product in methyl Cellosolve of R. 20.0 parts of the above material were blended with 0.8 parts of dibutyl tin diacetate, and 5.0 parts of methyl Cellosolve. A 1½ mil drawdown was made on a metal panel and baked at 400° F. for 5 minutes. The resulting cured film exhibited excellent flow, gloss, and mar resistance, a pencil hardness of H–2H, and a reverse impact of greater than 160 in.-lbs.

EXAMPLE 8

Utilizing essentially the same procedure as in example 6, a polymer was prepared comprising 957 parts of styrene, 957 parts of butyl acrylate, and 816 parts of hydroxyethyl acrylate. 270 parts of 2-mercapto ethanol were utilized as the catalyst-initiator system. The resulting resin exhibited a solids content of 9.47%. 20.0 parts of this material were blended with 0.6 parts of dibutyl tin diacetate, and 5.0 parts of methyl Cellosolve. A 1½ mil drawdown of this material was baked on a Bonderite 1000 steel panel for 30 minutes at 350° F., producing a film having excellent flow, gloss and a good mar resistance, and a pencil hardness of F. The film passed a 160 in.-lb. reverse impact test.

The above examples are meant to merely be illustrative of the instant invention. Many other variations may be made on the instant invention without departing from the scope and spirit of the instant invention.

What is claimed is:

1. A thermoset coating composition comprising:
   A. a co-polymer prepared by copolymerizing from about 10% to about 60% by weight, based upon the total co-polymer composition, of alpha, beta, ethylenically unsaturated, aliphatic, hydroxy-containing monomers; at least 1 mol of an ester monomer per mol of hydroxy monomer, wherein the ester monomer has the general formula:

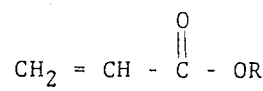

wherein R is an alkyl group having 5 or less carbon atoms; and the remainder, if any, being another monomer co-polymerizable therewith;
   B. a catalyst selected from the group consisting of:

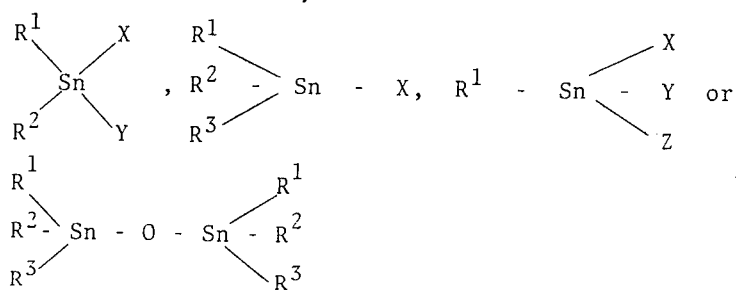

wherein $R^1$, $R^2$ and $R^3$ are 1 to 18 carbon atom alkyl or acyl groups and wherein X, Y, and Z are

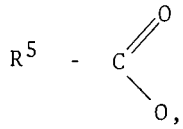

Cl—, Br—, I—, or —$OR^6$, wherein $R^5$ and $R^6$ are 1 to 18 carbon alkyl groups; and C. a solvent therefor.

2. The composition of claim 1 wherein the catalyst is selected from the dialkyl tin dicarboxylates, the dialkyl tin dichlorides, the trialkyl tin carboxylates, the trialkyl tin chlorides, and the trialkyl tin oxides.

3. The composition of claim 2 wherein the catalyst is dibutyl tin dilaurate.

4. The composition of claim 2 wherein the catalyst is dibutyl tin diacetate.

5. The composition of claim 2 wherein the catalyst is dibutyl tin dichloride.

6. The composition of claim 1 wherein the catalyst is present at the 0.5 to 10% by weight level, based on the copolymer solids content.

7. The composition of claim 1 wherein the hydroxy monomer is selected from hydroxyethyl acrylate and hydroxypropyl acrylate.

* * * * *

UNITED STATES PATENT OFFICE
CERTIFICATE OF CORRECTION

Patent No. 3,914,208          Dated October 21, 1975

Inventor(s) Donald D. Carlos et al.

It is certified that error appears in the above-identified patent and that said Letters Patent are hereby corrected as shown below:

The term of this patent subsequent to

January 7, 1992, has been disclaimed.

Signed and Sealed this

Sixth Day of July 1976

[SEAL]

Attest:

RUTH C. MASON
*Attesting Officer*

C. MARSHALL DANN
*Commissioner of Patents and Trademarks*